(No Model.)

H. H. GARRARD.
SULKY.

No. 493,582. Patented Mar. 14, 1893.

Attest
R. B. Moser
Georgia Schaeffer

Inventor
Henry H. Garrard
By
H. T. Fisher
Attorney

UNITED STATES PATENT OFFICE.

HENRY H. GARRARD, OF CLEVELAND, OHIO.

SULKY.

SPECIFICATION forming part of Letters Patent No. 493,582, dated March 14, 1893.

Application filed December 9, 1892. Serial No. 454,612. (No model.)

*To all whom it may concern:*

Be it known that I, HENRY H. GARRARD, a citizen of the United States, residing at Cleveland, in the county of Cuyahoga and State of Ohio, have invented certain new and useful Improvements in Sulkies; and I do hereby declare that the following is a full, clear, and exact description of the invention, which will enable others skilled in the art to which it appertains to make and use the same.

My invention relates to improvements in sulkies, and the invention consists in a sulky in which the wheels are supported in the extremities of the shafts or thills, all substantially as shown and described and particularly pointed out in the claims.

Figure 1:
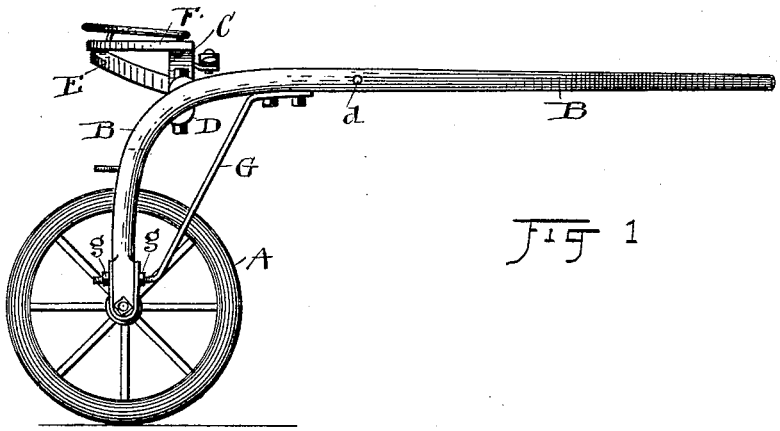
Figure 2:
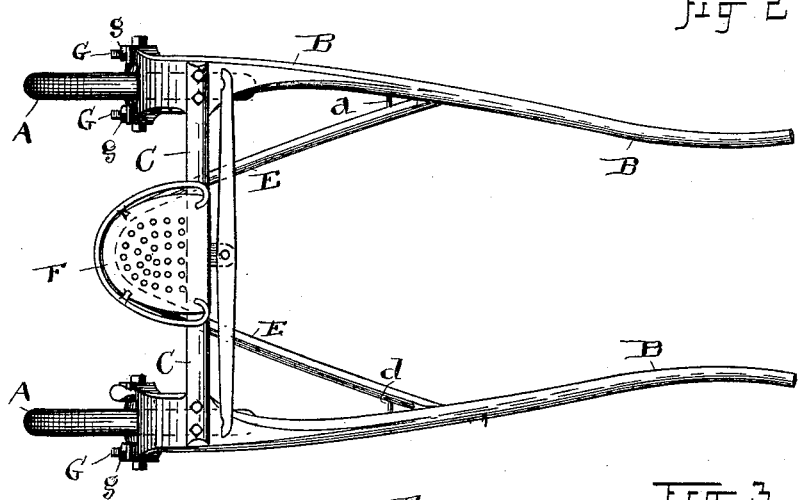

In the accompanying drawings, Figure 1 is a side elevation of my improved sulky. Fig. 2 is a plan view thereof, and Fig. 3 a rear elevation.

Figure 3:
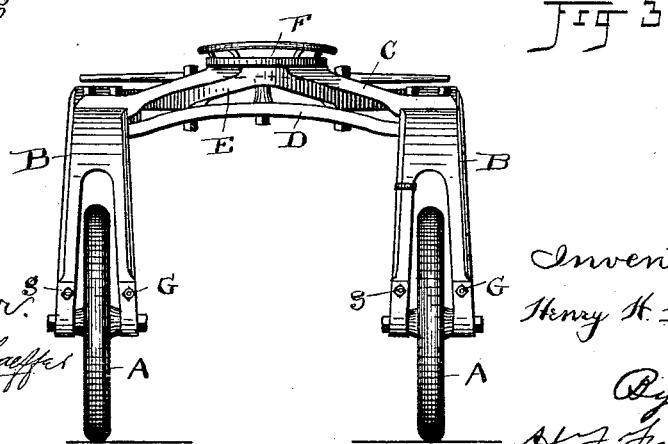

The idea of the invention is clearly disclosed in the drawings, and the elevation of the wheels A in respect to the thills or shafts B is seen in Figs. 1 and 3. It will be noticed that, as compared with the elevation of the shafts, the wheels are exceedingly low and that no axle is provided, and that the space between the wheels and between the downwardly curved or bent extremities of the shafts is entirely free and open. It is designed that the shafts shall come to the usual elevation, and that the seat shall be as high as formerly in sulkies having high wheels, so as to bring the driver to the proper elevation in respect to the horse. The advantage in having this space between the wheels and with the extremities of the shafts open and clear is obvious. It enables the horse to be placed well back in the vehicle and gives entire clearance and freedom to his movements, though the vehicle be close upon his heels.

I have shown in the drawings the shafts B made out of a single piece of suitable wood and bent downward substantially at right angles for a suitable distance at their rear, and bifurcated or split so as to leave an open space between the extremities on each shaft for the wheel A. The said wheel A has a suitable spindle supported in the shaft B, and it may be a wheel with a pneumatic tire or any other suitable wheel as may be found desirable. Obviously, each shaft might be made in more than one piece if preferred, but I prefer to bend the shaft out of a single piece of wood cut the desired shape and size. The said shafts are connected at the point where the bend begins by suitable truss bars or pieces C and D, one extending across the top of the shafts and the other across on the under side thereof, and both firmly fastened thereto. Then a bow E is projected through between these two cross bars or pieces C and D from the rear and fastened thereto by bolting through the several parts or by other equivalent means, and with the ends of the bow secured to the shafts on the respective sides and serving as a brace therefor. The rear portion of this bow behind the truss or cross bars C and D is fashioned to form a rear support for the driver's seat F, and the said seat is supported upon the said bow and the truss. Between the ends of the said bow and the shafts are foot rests $d$ for the driver.

All the parts of the frame of the sulky are made of wood so as to make the vehicle exceedingly light, and a full sized vehicle adapted for use may be made in this way and need not exceed forty (40) pounds in weight. The bifurcated ends of the shafts have brace rods G extending forward and upward to the under side of the shafts, and there is one such rod for each of the bifurcated ends of each shaft, making two on each side of the frame. The lower extremities of these rods pass through the ends of the shafts and are threaded and provided with nuts $g$ on either side of the shaft. This enables the wheels to be set into perfect alignment with the direction of travel, and to always keep them in that position, and each wheel may be separately adjusted by this mechanism.

Having thus described my invention, what I claim is—

1. A sulky having the carrying wheels supported in the ends of the shafts, substantially as described.

2. In a sulky, a pair of shafts and a carrying wheel journaled in the end of each shaft, substantially as described.

3. The shafts bent downward at their rear ends and bifurcated, and a wheel supported in each of said bifurcated ends, substantially as described.

4. In a sulky, the shafts thereof bent downward at their rear ends and bifurcated, and a brace for the lower end of each shaft to adjust the position thereof into alignment with the direction of travel, and wheels between said bifurcated ends, substantially as described.

5. In a sulky, the shafts and a wheel separately supported in the end of each shaft, a truss connecting said shafts above said wheels, and strengthening braces between truss and shafts, substantially as described.

6. The combination of the shafts and the wheels supported in the ends thereof the truss connecting the shafts, the bow fixed to the truss and the shafts, and the seat on the truss and bow, substantially as described.

Witness my hand to the foregoing specification.

HENRY H. GARRARD.

Witnesses:
H. T. FISHER,
GEORGIA SCHAEFFER.